United States Patent [19]
Konow

[11] Patent Number: 5,363,588
[45] Date of Patent: Nov. 15, 1994

[54] GOTCHYA FISHHOOK

[76] Inventor: Paul A. Konow, 1035 Horsham Rd., Horsham, Pa. 19044

[21] Appl. No.: 89,800

[22] Filed: Jul. 9, 1993

[51] Int. Cl.$^5$ ............................................. A01K 85/00
[52] U.S. Cl. .................................................. 43/43.16
[58] Field of Search ............................. 43/43.16, 43.4

[56] References Cited

U.S. PATENT DOCUMENTS

| | | | |
|---|---|---|---|
| 595,995 | 12/1897 | Dreese | 43/43.16 |
| 2,217,928 | 10/1940 | Ward | 43/43.16 |
| 2,233,863 | 3/1941 | Driscoll | 43/43.16 |
| 3,505,756 | 4/1970 | Bowden | 43/43.16 |
| 3,624,690 | 11/1971 | Ashley | 43/43.16 |
| 3,841,014 | 10/1974 | Thomas | 43/43.16 |
| 4,757,634 | 7/1988 | Meixsell | 43/43.16 |

FOREIGN PATENT DOCUMENTS

| | | | |
|---|---|---|---|
| 1382462 | 3/1988 | U.S.S.R. | 43/43.16 |

Primary Examiner—Kurt Rowan
Attorney, Agent, or Firm—William H. Meise

[57] ABSTRACT

In accordance with the invention, a fishhook includes a shank portion and a curved hook portion. The hook portion includes a point at its end remote from the shank, and defines a cavity adjacent the point. The opening of the cavity faces the shank. A movable barb is affixed for movement between a retracted position, in which the barb is substantially contained within the cavity, and an extended position, in which at least a portion of the barb protrudes. A spring arrangement urges the barb toward its protruding position. In one embodiment of the invention, a hinge pin is affixed to the hook portion adjacent the point, and transfixes the movable barb for rotary motion between the retracted and protruding positions. The spring arrangement is a leaf spring affixed to an edge of the barb. A stop is provided to prevent excessive rotary motion.

6 Claims, 1 Drawing Sheet

GOTCHYA FISHHOOK

FIELD OF THE INVENTION

This invention relates to barbed fishhooks, and more particularly to fishhooks with retractable barbs.

BACKGROUND OF THE INVENTION

Fishing is an important activity which is engaged in for sport and for profit. When fishing for pleasure, and when it is considered that a single fish may fetch hundreds of dollars at market, it is important to maximize the probability of retaining a fish on a hook once it has taken the bait. A conventional fishhook has a barb or barbs which tend to prevent the fish from escaping the fishhook after the hook is engaged. However, the barbs tend to tear a large hole or aperture in the fish when they enter. During the playing of the fish in order to effectuate its capture, tension on the fishline is transferred to the hook entrance aperture, which tends to enlarge. The torn entrance aperture, after enlargement during playing, may be large enough so that, when tension is momentarily released, the fishhook may drop out of the aperture, allowing the fish to escape. An improved fishhook is desired.

SUMMARY OF THE INVENTION

In accordance with the invention, a fishhook includes a shank portion and a curved hook portion. The hook portion includes a point at its end remote from the shank, and defines a cavity adjacent the point. The opening of the cavity faces the shank. A movable barb is affixed for movement between a retracted position, in which the barb is substantially contained within the cavity, and an extended position, in which at least a portion of the barb protrudes. A spring arrangement urges the barb toward its protruding position. In one embodiment of the invention, a hinge pin is affixed to the hook portion adjacent the point, and transfixes the movable barb for rotary motion between the retracted and protruding positions. The spring arrangement is a leaf spring affixed to an edge of the barb. A stop is provided to prevent excessive rotary motion.

DESCRIPTION OF THE INVENTION

Figure 1B:
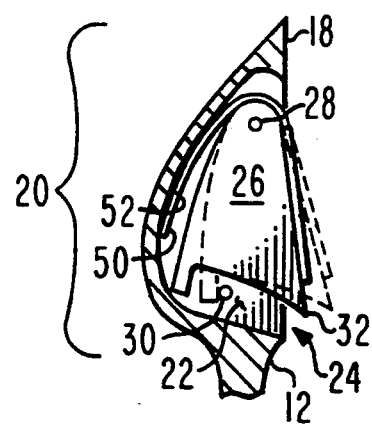
FIG. 1b is a cross-sectional view of the tip portion of the fishhook of FIG. 1a, illustrating the barb in a substantially retracted position.
Figure 1A:
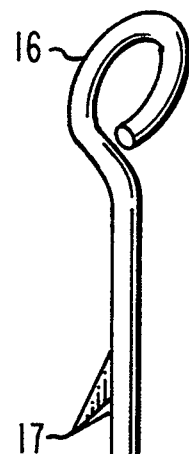
FIG. 1a is a perspective or isometric view of a fishhook according to the invention, in which the barb is seen in its protruding position.
Figure 1A:
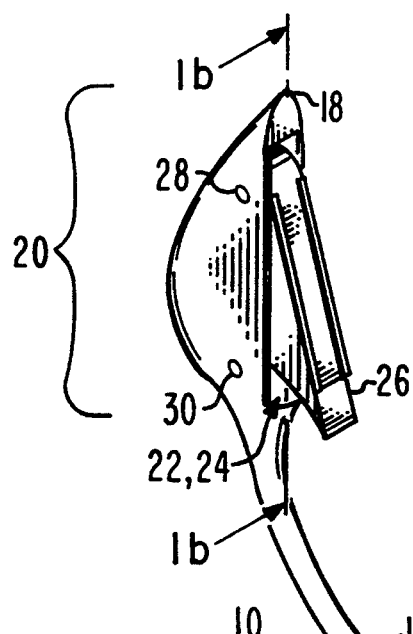

In FIGS. 1a and 1b, a fishhook 10 includes an elongated structural member, which may be made from steel, and which defines a curved hook portion 12, integral with a shank portion 14. Shank portion 14 is straight, and extends from an eyelet 16 to a point 15 where the curvature of the hook portion begins. Eyelet 16 provides a convenient location for affixing a fishline to hook 10, as by knotting in a conventional manner. Hook portion 12 together with shank 14 define a fishhook plane. An anti-slip barb 17 is affixed to shank 14, and extends in the fishhook plane to prevent the fish from escaping by riding up the shank onto the fishline.

A point 18 is formed at the end of hook portion 12 of fishhook 10 of FIGS. 1a and 1b. Hook portion 12 defines an enlarged region 20 adjacent point 18. Within enlarged region 20, a cavity 22 defines an aperture 24 facing shank 14. A barb member 26 is hingedly affixed for rotational movement by a hinge pin 28. The illustrated position of barb member 26 is almost fully retracted, while the extended position is represented by dash-lines. Hinge pin 28 is preferably affixed to the sides of cavity 22, and is free to rotate relative to barb member 26. A stop pin 30 prevents the barb member from excessive rotation about hinge pin 28, which might present a smooth surface to a fish engaged on the hook, thereby allowing its escape. A leaf spring 50 affixed to barb member 26 bears against an inside wall 52 of cavity 20 and provides force for urging barb member 26 toward the extended position.

Figure 2A:
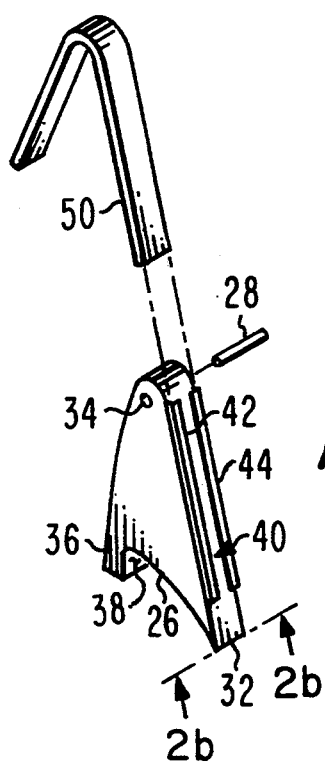
FIG. 2a is an exploded perspective or isometric view of a leaf spring, hinge pin and barb member.
Figure 2B:
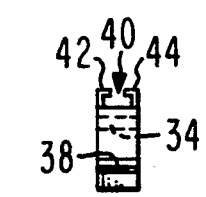
FIG. 2b is a cross-sectional view of the barb member of FIG. 2a taken along section lines 2b—2b.

Barb member 26, as illustrated in FIGS. 1a, 1b and 2, is roughly triangular, and includes a pointed fish-engaging tip portion 32. An aperture clears hinge pin 28, allowing rotation thereabout. A protruding boss 36 defines a bearing surface 38 against which stop pin 30 (not illustrated in FIG. 2) may bear for preventing excessive rotation. A channel 40 is provided by angle pieces 42 and 44 for retention of one end of flat leaf spring 50.

The fishhook according to the invention has the disadvantage of being larger in diameter than the hook portion of an ordinary fishhook, but the enlarged portion is smaller in overall diameter than the combination of the prior art hook with its barb, and therefore tends to make a smaller aperture when engaging. The barb 7-8 retracts as the hook engages the fish, and the spring is compressed.

Other embodiments of the invention will be apparent to those skilled in the art. For example, hinge pin 28 may be a screw, or it may be a pin retained by swaging. While a leaf spring is illustrated, other spring members may be used, such as a metallic coil spring. As an alternative, an elastomeric foam may be used, which may have the advantage of excluding sand or debris from the cavity, which might prevent the barb member from reaching the retracted position.

What is claimed is:

1. A fishhook, comprising
an elongated structural member including a generally smooth hook portion defining a point end and a support end, said hook portion being formed into a generally curved shape, said hook portion further defining a cavity adjacent said point end;
a shank defining first and second ends, said first end being monolithically contiguous with said support end of said hook portion of said fishhook;
line coupling means affixed to said second end of said shank, adapted for coupling said fishhook to a fishline;
movable barb means affixed within said cavity for movement between a retracted state in which substantially all of said barb means lies generally within said cavity, and a projecting state in which a portion of said barb means projects from said cavity;
spring means coupled to said barb means for urging said barb means toward said projecting state; and
a hinge pin affixed to at least one of said barb means and said hook portion for providing rotational freedom for motion of said barb means between said retracted and projecting states.

2. A fishhook according to claim 1, further comprising an anti-slip barb affixed to said shank.

3. A fishhook according to claim 1 wherein said spring means comprises a leaf spring.

4. A fishhook according to claim 1, wherein the aperture of said cavity faces said shank.

5. A fishhook, comprising:

an elongated structural member including a generally smooth hook portion defining a point end and a support end, said hook portion being formed into a generally curved shape, said hook portion further defining a cavity adjacent said point end;

a shank defining first and second ends, said first end being monolithically contiguous with said support end of said hook portion of said fishhook; p1 line coupling means affixed to said second end of said shank, adapted for coupling said fishhook to a fishline;

elongated, movable barb means defining a first end and a second end, said barb means being dimensioned to fit substantially completely within said cavity;

hinge means coupled to an extreme of said first end of said barb means and to said cavity affixing said barb means within said cavity of said hook portion of said fishhook, and for movement of said barb means between a retracted state in which substantially all of said barb means lies generally within said cavity, and a protecting state in which said second end of said barb means projects from said cavity;

spring means coupled to said barb means for urging said barb means toward said projecting state; and wherein said hinge means comprises:

a hinge pin transversely affixed to said cavity; and an aperture defined in said first end of said barb means, said aperture surrounding said hinge pin for movement relative thereto.

6. A fishhook according to claim 5, wherein said line coupling means comprises an eyelet.

* * * * *